April 30, 1968  H. FLEISSNER ETAL  3,380,175
ROTARY SIEVE DRUM TREATING DEVICE
Filed Nov. 26, 1965 2 Sheets-Sheet 1
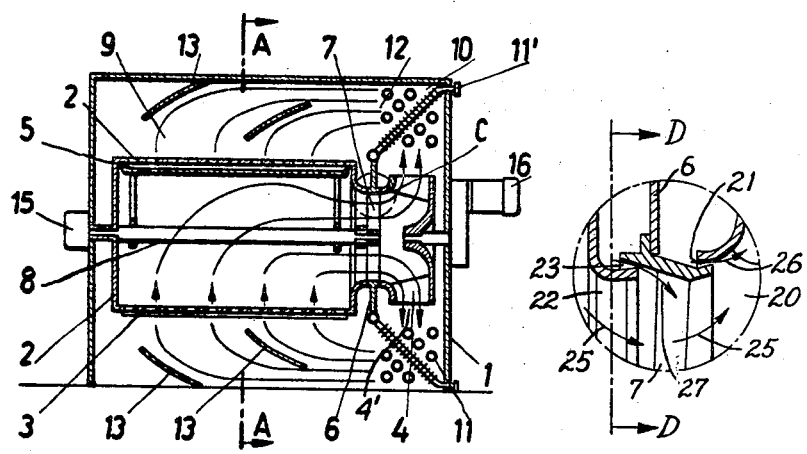
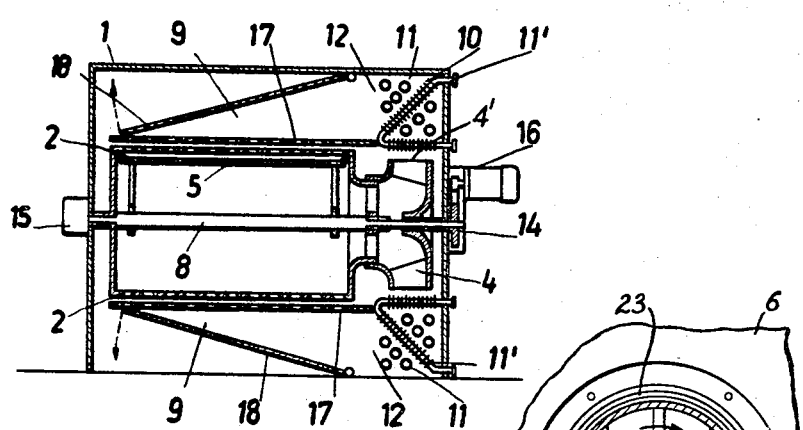
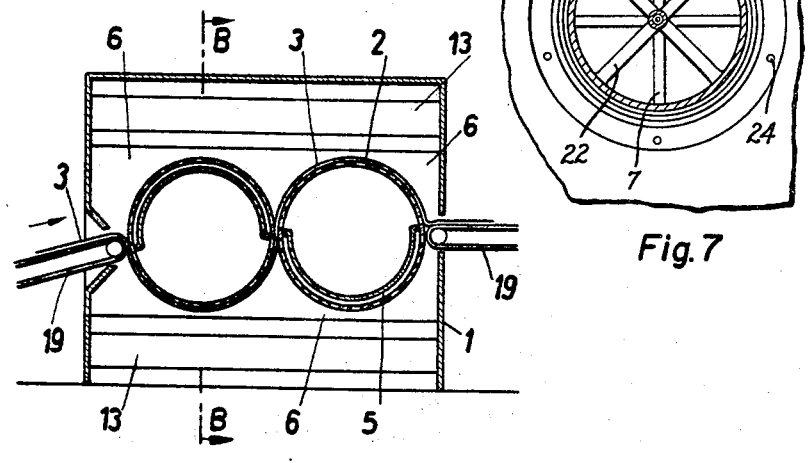
Inventors
HEINZ FLEISSNER
GEROLD FLEISSNER
BY Dicke + Craig
ATTORNEYS April 30, 1968 H. FLEISSNER ET AL 3,380,175
ROTARY SIEVE DRUM TREATING DEVICE
Filed Nov. 26, 1965 2 Sheets-Sheet 2

Inventors
HEINZ FLEISSNER
GEROLD FLEISSNER
BY Dicke & Craig
ATTORNEYS

United States Patent Office 3,380,175
Patented Apr. 30, 1968

3,380,175
ROTARY SIEVE DRUM TREATING DEVICE
Heinz Fleissner and Gerold Fleissner, Egelsbach, near Frankfurt am Main, Germany, assignors to Anstalt fuer Patentdienst, Vaduz, Liechtenstein
Filed Nov. 26, 1965, Ser. No. 509,935
Claims priority, application Germany, Nov. 27, 1964, A 47,706
32 Claims. (Cl. 34—115)

ABSTRACT OF THE DISCLOSURE

The present disclosure relates to an apparatus for the treatment of various types of materials, for example, textile materials, wherein the treatment medium, for example, air, is conveyed through the apparatus in a non-turbulent manner, thus providing a uniform and effective treatment of said material. This is accomplished by providing a transmission area between the fan chamber and the treatment chamber of a sieve drum which is substantially void of any partition means. The present disclosure also relates to the vertical arrangement of a sieve drum apparatus.

---

The present invention relates to a device for the treatment, especially for drying of all kinds of material, preferably of loose textile material, within a closed housing which is divided into a treatment chamber with at least one sieve drum subjected to a suction draft and into a fan chamber with at least one fan arranged on the side of the sieve drum; heating devices are arranged in the fan chamber, preferably at both sides of the fan, while the treatment medium, e.g., the drying air, sucked out of the sieve drum by the fan, is returned over the heating devices into the treatment chamber. The treatment medium reutrned into the treatment chamber is sucked again through the material adhering to the sieve drums and is thus circulated.

Devices are known in the prior art in which sieve drums subjected to a suction draft are used for transporting the material through the treatment chamber. The suction draft is produced by radial fans arranged at the side of the sieve drums. In these prior art devices the treatment chamber with the sieve drums is separated from the fan chamber with the fans by means of a partition wall. In a dryer with horizontally arranged sieve drums, the fan chamber is connected with the treatment chamber at the bottom and at the ceiling thereof to enable the return flow of the air discharged in the upward and downward directions by the fans. If the sieve drums are arranged vertically, the air flows back into the treatment chamber at both sides of the sieve drums. The stationary wall serves, at the same time, for the support of the sieve drums.

In order to achieve an intense air flow over the heating devices arranged in the fan chamber and in order to provide sufficient space for the air to distribute equally over the entire working width after entering the drum chamber, the partition wall between fan and treatment chambers have been designed heretofore in such a way that there are only narrow cross sections for the air, i.e., only narrow free transmission areas for the air between fan and treatment chambers. For equal uniform distribution of the air over the entire working width, the known devices are equipped with additional, so-called air-guiding boxes and/or perforated sheets or other air-strangling or throttling means.

However, it could not be avoided with all these measures that the distribution of the air over the working width differs, if different quantities of material are carried on the sieve drums, and if thus the quantity of circulated air differs; also turbulence of the air, returned into the treatment chamber, could not be completely avoided with these prior art measures. Turbulence, however, results in blowing-off of the material which is extremely harmful.

The present invention has as one of its objects to improve the flow conditions in a dryer of the type described hereinabove, especially to avoid air whirls and to distribute the circulated air equally or uniformly over the entire working width of the sieve drum or drums.

According to the present invention, this task is solved with a device of the type described hereinabove by providing a free transmission area for the treatment medium between the fan chamber and the treatment chamber, which transmission area is of the same size or larger than the air oulet area of the fan wheel.

It is suggested with another embodiment of the present invention not to divide fan and treatment chambers, at least not within the range of the heating devices. It is of advantage if the wall between treatment and fan chambers is of the same height or smaller than the sieve drum diameter. This creates a very large transmission area for the air, which flows back from the fan chamber into the treatment chamber. This means that the air is not strangled or throttled at the transmission opening as was the case up to now. Distribution of the air over the entire working width is thus essentially facilitated.

According to another feature of the present invention, it is suggested to omit the wall between the fan and treatment chambers; since, as already stated, the sieve drums are normally supported by that wall, another support for the sieve drums must be provided. One possibility is to connect the cast-iron spider with a supporting frame. However, air whirls may also form at the supporting frame. It is therefore, suggested in connection with another feature of the present invention, with a view toward the aforementioned object, to support the sieve drum at the fan side in the fan wheel so that the frame may be dispensed with. Instead of supporting the sieve drums in the fan wheel, the shaft of the sieve drum may also be extended through a concentric bore within the fan wheel and may be supported in the driving shaft of the fan wheel.

According to another object of the present invention, it is suggested to construct and arrange the heating devices in such a way that they are also able to serve as deflecting elements for the air flowing back into the treatment chamber. If ribbed tubes are used as heating devices, at least one layer of ribs may be arranged in the fan chamber obliquely towards the outside. In that case the ribbed tubes may not be arranged parallel to the direction of material passage, i.e., in general horizontally, as was the case up to now, but they must be arranged essentially perpendicular to the direction of material passage. If the ribbed tubes are arranged obliquely, the ribbed tubes serve as deflecting elements, i.e., they deflect the air which is discharged upwards and downwards by the fans into the treatment chamber and thus to the sieve drums.

A good air distribution in the fan chamber and air deflection towards the treatment chamber is obtained, if, according to another feature of the present invention, at least a portion of the ribbed tubes have a V-shape and if the tip of the V is directed towards the treatment chamber, the upper end being connected with the feed line for the heating medium and the other lower end being connected with the discharge line for the heating medium. This arrangement ensures that the connection to the steam feed line is favorable and additionally that the condensate which might form in the ribbed tubes may flow off readily.

If large quantities of air are circulated, large flow velocities of the treatment medium, e.g., of the drying air, occur. These high speeds might cause the air current to break away or detach from the walls in the exhaust connection and the cast-iron spider and to form whirls. In the devices which are known at present, the stationary cast-iron spider slightly extends into the exhaust connection of the fan wheel. The air which is sucked through that annular slit causes the air flow to break away or detach from the fan wheel wall and/or the wall of the exhaust connection and thus causes the formation of air whirls. It has been found in accordance with the present invention that the air whirl formation and detachment of the air from the wall of the exhaust connection of the fan wheel can be avoided if the annular slit between fan wheel and cast-iron spider is constricted or tapers in the direction toward the fan wheel. The air is led along the internal wall of the exhaust connection by this jet-like effect. Any detachment of the air from the exhaust connection is thus avoided. Furthermore, it is of advantage if this jet-like effect is also ensured at the slit between cast-iron spider and sieve drum spider. It is, therefore, suggested to construct the cast-iron spider in such a way that it partly surrounds the sieve drum spider and that the annular slit between cast-iron spider and sieve drum spider is constricted in a jet-like manner in the direction toward the cast-iron spider.

Tests have shown that the air guiding boxes arranged in the treatment chamber, which air guiding boxes consist of many, relatively short blades arranged close to each other, may be omitted and that instead of these air guiding boxes, a construction according to the present invention and consisting of one to two blades at a large distance from each other is more favorable in the case of larger working widths. However, according to the present invention, these blades must be much longer than the blades used up to now in order to guide the air over a longer path. These deflection blades are mounted so as to swivel according to the present invention in order to permit the blades to adapt themselves to the varying air speeds.

Since there is an ever increasing shortage of adequate large factory space, there is a certain trend in continuous manufacture of textile material and also in the case of other materials which are to be processed and manufactured in continuous processing ranges, not to construct the processing plants on the ground-floor exclusively but to accommodate them in different stories or floors. In order to maintain continuous treatment, the material to be treated is transported on conveyor belts extending obliquely upwards or downwards from one story to another one. These conveying devices for transporting the material from one story to another one require part of the valuable space of the building which is intended for the individual plants, and additionally they render the production plants much more expensive. If the factory facilities do already exist and therewith the buildings for the plants, it will not be possible to accommodate the plant in different stories. The only possibility in that case is to choose suitable machines and to keep the continuous processing plant as small as possible. Apart from the other known advantages, this is one of the reasons why sieve drum dryers and other plants with sieve drums subjected to a suction draft, which with the same treatment effect are considerably smaller, are preferred to other processing plants.

According to another feature of the present invention, the lack of space existent in many factories is taken into account even further by arranging the sieve drums subjected to a suction draft of each row vertically one above the other. Preferably the sieve drums are arranged vertically one above the other in one row only. If a relatively long treatment path and thus long treatment times are required, it may be expedient to arrange the sieve drums vertically one above the other in two rows whereby the sieve drums of the individual rows are arranged staggered to each other, as is known, preferably in such a way that the material is alternately taken over and guided by a sieve drum of the one row and then by a sieve drum of the other row.

However, it is also feasible that the material is carried upwards by one row of sieve drums, is then passed over to the next row of sieve drums, and is thereafter carried downwards by the sieve drums of the second row.

An essential advantage of this type of vertical dryer is, above all, that the dryer may extend over various stories so that intake and delivery end of the dryer are accommodated in different stories, whence the dryer may, at the same time, serve as a conveying means from one story to the other one which means that the usual conveyor belts between the individual stories may be saved and/or omitted.

If the processing device, especially the dryer, extends over more than two stories, it is expedient to provide the dryer with one intake or delivery end in each story. A conveyor belt may serve as feeding and discharging device at the dryer intake and delivery end, whose direction of motion can be reversed, according to another feature of the present invention so that the material in the dryer can be handled optionally in one or the other direction and that only one conveyor belt must be provided in the individual stories which optionally may serve as intake or delivery end for the material to be processed.

However, the vertical arrangement of the sieve drums offers other essential advantages as well. Cleaning of the device is essentially facilitated since only a relatively small floor space must be cleaned. In order to return to the sieve drum the material, which becomes detached from the drums and which falls down according to another feature of the present invention, at least one further conveyor belt or a chute inclined towards the sieve drum is provided preferably at the same level as the lower conveyor belt but usually opposite to that conveyor belt. The material which has fallen off the sieve drums is thereby fed to the sieve drums anew by this second conveyor belt or chute.

Up to now it was thought impossible to carry the material to be processed in the upward or vertical direction by means of sieve drums if loose material in involved, because with vertically arranged sieve drums the material to be processed must be lifted by means of the suction draft when being passed over from one drum to the next. Generally, it was feared that the loose material would not become detached from the lower sieve drum and be passed properly over to the sieve drum above. Also the air flow in the dryer with vertically arranged drums was considered unfavorable. Surprisingly, it has been found, however, that in the case of a dryer and/or a processing plant according to the present invention with the drums arranged in one vertical row, the flow conditions are much better than in a dryer with the drums arranged in one horizontal row. It has been found that the energy requirements for holding and guiding the material on the drums must, by no means, be higher with a vertical device according to the present invention than with the known devices in which the sieve drums are arranged in one horizontal row, but that with suctions drafts of approximately the same force the material is very well guided and passed from one drum to the drum above. Also a detachment and falling-off of the material to be processed occurs less frequently than in the known devices. The explanation may be found in that, contrary to the generally prevailing opinion, the highest energy requirement, i.e., the most powerful suction draft, for holding the material does not occur at the lowest point of the sieve drum but within the lower lateral range of the sieve drums. This, in turn, can be explained by the fact that at the lowest point the force for holding the material must only correspond to the weight of the material whereas the material, which is guided and held laterally to the sieve drums, tends to slide off the sieve drums, especially if the coefficient of friction is low, and to detach below from the drum by its own weight which results in a falling-off of the material.

In the known devices with the drums arranged horizontally adjacent to each other, the air impinges almost radially onto the drum jacket at the lower and at the upper portions of the drum so that the most favorable suction conditions prevail at those portions. However, as stated above, the problem of holding the material to the drum is not critical at those portions but instead at the lateral portions of the sieve drums. In the device according to the present invention, the air impinges radially onto the lateral portions of the individual sieve drums so that the best flow conditions prevail at those portions and favor adherence of the material to those portions. Since adherence of the material to the lateral portions of the drum is not as safe as that to the lower portion of the individual sieve drums, this shows clearly that the flow conditions are more favorable with the drum arrangement according to the present invention.

Another advantage of this dryer is that the operators may carry out repair work in an upright position which is much better as regards accuracy of the work and required energy. In the case of the known devices, such work must generally be carried out in a lying-down position.

Entrance into the sieve drum dryer according to the present invention is possible through a door, flap or the like which is provided near the floor in the dryer housing.

Owing to the numerous advantages this vertical type device is not only expedient where it simultaneously serves for transportation of the material from one story to another one but can be recommended for all general purposes.

These and further objects, features, and advantages of the present invention will become more obvious from the following description when taken in connection with the accompanying drawing which shows, for purposes of illustration only, several embodiments in accordance with the present invention, and wherein:

FIGURE 1 is an axial cross sectional view through a first embodiment of a treatment device according to the present invention, taken along lines B—B of FIGURE 3;

FIGURE 2 is an axial cross-sectional view through another embodiment of a treatment device according to the present invention;

FIGURE 3 is a longitudinal cross-sectional view through the treatment device according to FIGURE 1, taken along line A—A of FIGURE 1;

FIGURE 4 is an enlarged partial cross-sectional view illustrating the connection from the sieve drum to the exhaust connection of the fan wheels and corresponding to section C of FIGURE 1;

FIGURE 7 is a section of FIGURE 4 taken along line D—D of FIGURE 4.

Figure 5:
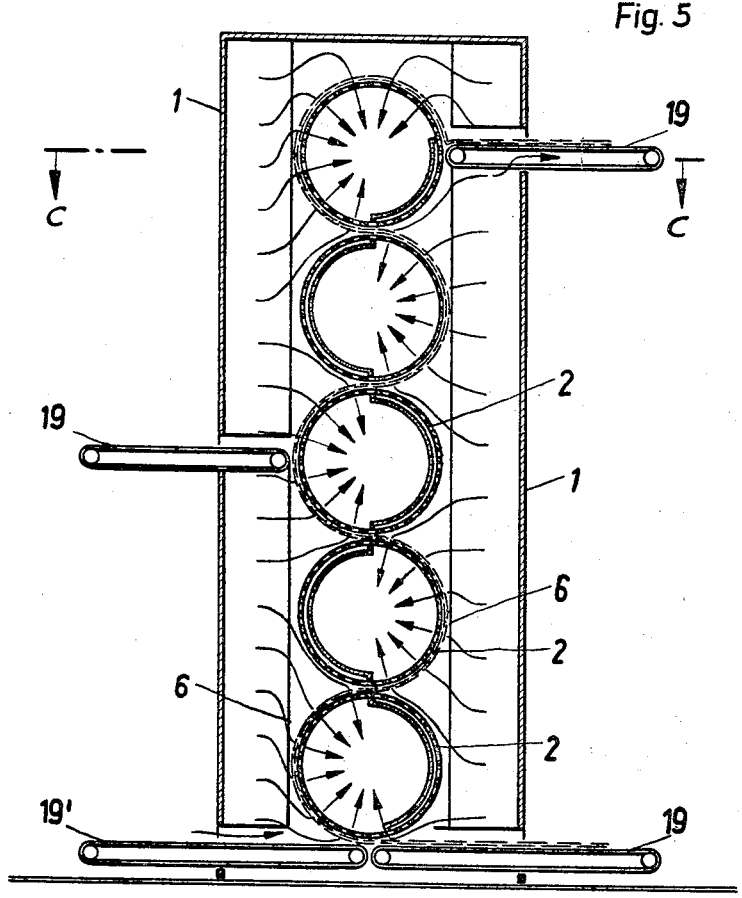
FIGURE 5 is a longitudinal cross-sectional view through a vertical sieve drum dryer according to the present invention.
Figure 6:
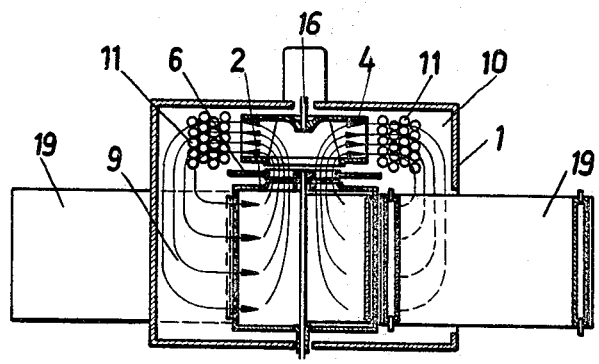
FIGURE 6 is a cross section through the vertical sieve drum dryer of FIGURE 5, taken along line C—C in FIGURE 5.

The processing devices shown in the figures are essentially used for drying air-permeable material, especially textile material. However, they are also suitable for steaming, heat-setting and other heat treatments.

Referring now to the drawing, wherein like reference numerals are used through the various views to designate like parts, the devices consist of a closed hossing 1 in which are arranged sieve drums 2 subjected to a suction draft as conveying means for material to be treated 3. The material 3 is held to the sieve drums 2 by the suction draft only. The suction draft further causes the treatment medium to pass through the material 3 and thus produces a close contact of the treatment medium with the material to be treated which results in extremely rapid and good heat transfer. The suction draft is created by a fan 4 which has a fan outlet area 4' and which is arranged at the side of each individual sieve drum 2. Baffle plates 5 are provided in the sieve drums 2 for interrupting the suction draft at the portion of the sieve drum which is not to be covered by the material 3. In the device according to FIGURE 1 a partition wall 6 is provided between fan wheel 4 and sieve drum 2 which supports a cast-iron spider 7. The shaft 8 of the sieve drum 2 is supported in the cast-iron spider 7.

The partition wall 6 divides the interior of the housing into a treatment chamber 9 and into a fan chamber 10. If several sieve drums are arranged horizontally one beside the other, the heating devices which, in the device shown, consist of ribbed tubes 11, are arranged above and below the fan 4. If the sieve drums are arranged vertically one above the other, the heating devices 11 are arranged on both sides of the fan wheels. The present invention, therefore, also applies to such devices with the sieve drums arranged vertically one above the other.

As may be gathered from FIGURE 1, one layer 11' of the ribbed tubes 11 is arranged obliquely so that the air which is discharged upwards and downwards by the fan is deflected toward the treatment chamber 9 by the ribs of the oblique ribbed tubes 11.

Since the height of the wall 6 essentially corresponds to the diameter of the sieve drum 2, large outlet areas 12 (transmission areas) result through which the air passes from the fan chamber 10 into the treatment chamber 9. These large outlet areas 12 do not strangle or throttle the air while it passes through the same, as was the case up to now, and which favored the formation of air whirls, but instead the air may flow into the treatment chamber 9 over the whole width and may distribute over the entire working width. To favor distribution of the air, two large deflecting sheets 13 each are arranged above and below the sieve drums 2. However, according to the present invention, also more than two deflection sheets may be provided. In the case of smaller working widths even one deflection sheet 13 will suffice.

The device according to FIGURE 2 is similar in design to the device according to FIGURE 1. However, in the device according to FIGURE 2, the wall 6 between the fan chamber 10 and the treatment chamber 9 has been omitted. Therefore, the arrangement of a cast-iron spider for supporting the sieve drum is no longer possible. The shaft 8 which carries the sieve drum 2 is, in this embodiment, supported in a hollow driving shaft 14 of the fan 4. A drive 15 for the drum 2 is arranged outside at the housing 1 just as in the device according to FIGURE 1. Also, a fan drive 16 is supported on housing 1 outside the fan wheel.

The ribbed tubes 11' for the deflection of the air have a V-shape in the device according to FIGURE 2, the tip of the V pointing towards the treatment chamber 9. This construction and arrangement of the ribbed tubes 11 according to the present invention does not only offer the advantage of a good air distribution and deflection, but it also offers proper possibilities of connection for the steam feeding lines and the steam discharging lines, as well as a proper condensate drain if the upper end is connected with the steam feed line and the lower end with the steam discharge line. In order to obtain a uniform air distribution over the entire working width, perforated sheets 17 and pivoted bottoms 18 are arranged in the treatment chamber 9 above and below the sieve drums 2, which bottoms 18 in conjunction with the perforated sheets 17 form a wedge-like chamber into which flows the air coming from the fan chamber. For cleaning and repair work, these bottoms 18 can be swivelled towards the ceiling of the housing 1 and/or towards the bottom where they may be arrested by appropriate, known means. In many cases these perforated sheets 17 are not required. Owing to the large outlet areas 12 the air distribution is, in general, so uniform and free from turbulence that even loose, fibrous material which tends to be blown off the drums does not fall off the sieve drums 2.

As may be gathered from FIGURE 3, one conveyor belt 19 each is provided for material feed and discharge; instead of such a conveyor belt 19 a pair of rollers may be provided at the intake and a chute or also a pair of rollers may be provided at the delivery end.

FIGURE 4 is the detail of circle C of FIGURE 1, which shows the connection from the sieve drum 2 to the fan wheel 4. The stationary cast-iron spider 7 which is fastened to the wall 6 engages with one end into an exhaust connection 20 of the fan wheel 4. An annular slit 21 between cast-iron spider 7 and exhaust connection 20 has, according to the present invention, a conical shape and is constricted or narrows toward the exhaust connection 20 of the fan wheel 4. An annular slit 23 between the cast-iron spider 7 and the sieve drum spider 22 is shaped in the same way, i.e., also the annular slit 23 is constricted or narrows in a jet-like manner toward the cast-iron spider 7. With this design of the annular slits 21 and 23, the air sucked through these annular slits is passed with a high speed along the internal wall of the exhaust connection 20 and/or the cast-iron spider 7 and thus prevents detachment of the sucked-in air from those walls and therewith prevents air turbulence even in the case of high speeds of the air flow.

Also in the device according to FIGURE 2 in which the sieve drum spider extends into the exhaust connection 20 of the fan wheel 4, the annular slit between those parts has a conical shape.

Arrows 25 show the total air flow as can be seen from FIGURE 1. The flow arrows 26 and 27 show the air flow through the annular slots 21 and 23. This air flow causes a laminar air current on the inner walls of the stationary ventilator star and on the inner wall of the rotating ventilator. Due to these laminar air currents, the eddies, which otherwise occur at this place are avoided and thus the corresponding spoiling losses are likewise eliminated. Thus, the ventilator operates more economically.

FIGURE 7 is a drawing showing a section through the drum spider. The section line is drawn in FIGURE 4. As can be seen from this drawing the drum spider which is fixed, and thus also the struts 22 rotate with the drum. Therebehind, the stationary ventilator star with the stationary struts 7 is provided. The ventilator star is mounted to the partition 6 by means of screws 24. The first annular slot 23 is likewise indicated. The annular slot 21, disposed behind the partition, is not illustrated.

In the sieve drum dryer shown in FIGURE 5, the sieve drums 2 are arranged in a vertical row one above the other. The sieve drum dryer shown extends over three stories. In each story, one conveyor belt 19 is provided as intake and delivery end depending on the direction of rotation of the drums and the respective conveyor belt. The lower conveyor belt 19 is correlated to another conveyor belt 19' by means of which from time to time material, which falls off the drums, may be transported to the lowest sieve drum. Instead of the conveyor belt 19', also a chute may be provided. The device is enclosed in a housing 1. A drive 16 for the fan wheels 4 as well as a drive (not shown) for the sieve drums 2 is preferably arranged outside the housing 1 and is fastened to the housing. In general, the fresh air, which will be sucked in through the inlet openings of the lower conveyor belts 19 and 19' will rise owing to the fact that it is heated up and will be discharged, e.g., through the opening for the upper conveyor belt 19. However, the reverse direction is possible as well. This can be achieved in a simple way by means of air guiding sheets within the fan chamber.

The construction of a cooling and steaming device is similar to that of FIGURE 5. In the case of a cooling device, the heating tubes 11 are just replaced by cooling coils. In the case of a steamer, a steam feed line must be provided and the conveyor belts 19 and 19' at the intake and the delivery end must be sealed so that no fresh air may enter.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A device for the treatment of materials which comprises a substantially closed housing, said housing being divided into a treatment chamber and a fan chamber, at least one sieve drum means subjected to a suction draft rotatably disposed within said treatment chamber, inlet means for introducing the material to be treated to said sieve drum means, fan means disposed in the fan chamber for drawing a treatment medium out of said sieve drum means and returning it to the treatment chamber, said fan chamber including fan wheel means provided with an outlet area for the treatment medium, the transmission area for the treatment medium between the treatment chamber and the fan chamber being at least as large as the fan outlet area, heating or cooling means provided within the circulation of the treatment medium, and outlet means for removing the treated material from the device.

2. The device of claim 1, wherein the heating means are provided within the fan chamber, said heating means being located such that the treatment medium is drawn out of the conveying means and returned to the treatment chamber over said heating means.

3. The device of claim 1, wherein the transmission area for the treatment medium between the treatment chamber and the fan chamber is larger than the fan outlet area.

4. The device according to claim 1, wherein said heating means are provided on both sides of the fan means.

5. The device according to claim 1, wherein said fan means is arranged at the side of the respective sieve drum means.

6. The device according to claim 1, in which said transmission area for the treatment medium between the fan chamber and the treatment chamber is devoid of any partition wall at least within the area of the heating means.

7. The device according to claim 1, further comprising partition wall means between said two chambers, said partition wall means being at most the same height as the diameter of the corresponding sieve drum means.

8. The device according to claim 1, in which the transmission area between said two chambers is unobstructed by any partition wall, and the sieve drum is supported at the fan side in the fan wheel means.

9. The device according to claim 1, wherein the fan wheel means is provided with a central bore and a drive shaft and the sieve drum means is provided with a shaft means, said shaft means extending through said central bore and supported within the drive shaft of the fan wheel means.

10. The device according to claim 1, further comprising a stationary cast-iron spider means extending into the exhaust connection of the fan wheel means, an annular slit being formed between the exhaust connection of the fan wheel means and said spider means which is constricted in the direction toward the fan wheel means.

11. The device according to claim 1, further comprising a stationary spider extending into the exhaust connection of the fan wheel means and a sieve drum spider means, said two spiders forming an annular slit therebetween which is constricted in a jet-like manner in the direction toward the stationary spider means.

12. The device according to claim 1, further comprising relatively long deflection blade means arranged within said treatment chamber.

13. The device according to claim 1, in which a plurality of sieve drum means are provided, the sieve drum means of a respective row being arranged substantially vertically, one above the other.

14. The device according to claim 7, wherein the partition wall means has a height smaller than the diameter of the respective sieve drum means.

15. The device according to claim 2, wherein said heating means provide deflecting means for the treatment medium flowing back into the treatment chamber.

16. The device according to claim 15, wherein said heating means include ribbed tubes disposed in the fan chamber and arranged in several layers, at least one layer of said ribbed tubes being disposed in such a way as to point obliquely toward the outside, said ribbed tubes being arranged substantially perpendicularly to the direction of material passage.

17. The device according to claim 16, wherein at least a portion of said ribbed tubes are arranged in a substantially V-shape, the tip of the V pointing towards the treatment chamber means, and feed and discharge lines are provided for the heating medium, the upper end of a V-shaped ribbed tube communicating with the feed line and the lower end thereof with the discharge line.

18. The device according to claim 10, further comprising a sieve drum spider means, said cast iron spider means forming with said sieve drum spider means an annular slit therebetween which is constricted in a jet-like manner in the direction toward the cast iron spider means.

19. The device according to claim 13, in which the transmission area for the treatment medium between said two chambers is substantially unobstructed by anp partition wall.

20. The device according to claim 13, in which the sieve drum means are arranged in two rows substantially vertically one above the other, the sieve drum means of each individual row being staggered to the sieve drum means of the other row.

21. The device according to claim 20, wherein the sieve drum means of the two rows are staggered in such a manner that the material is alternately passed over and guided by a sieve drum means of the one row and a sieve drum means of the other row.

22. The device according to claim 13, further comprising intake and delivery ends accommodated in different stories, the sieve drum means simultaneously serving as conveying means for the material from one story to another.

23. The device according to claim 13, wherein said device which extends over several stories and contains, intake and delivery ends, each story being provided with at least one of said intake and delivery ends.

24. The device according to claim 13, further comprising drive means for driving the sieve drum means, said device containing at least one intake and delivery end with, conveyor belt means disposed at said intake and delivery ends, and means for reversing the drive means for the sieve drum means and the conveyor belt means so that said device can be run selectively in both directions.

25. The device according to claim 20, in which said device is provided with intake and delivery ends accommodated in different stories so that the sieve drum means serves simultaneously as a conveying element for the material from one story to another story.

26. The device according to claim 25, wherein said device extends over several stories and contains, intake and delivery ends, at least one of said intake and delivery ends being provided in each story.

27. The device according to claim 26, further comprising drive means for the sieve drum means, conveyor belt means at the intake and delivery ends, and means for reversing the sieve drum drive means and the conveyor belt means to enable operation of said device selectively in either direction.

28. The device according to claim 13, wherein said device is provided with intake and delivery ends, first conveyor belt means for the intake end, and further means for returning loose, fibrous material falling down from the sieve drum means.

29. The device according to claim 28, wherein said further means includes a second conveyor belt means on the opposite side of said first conveyor belt means which returns the loose, fibrous material to the sieve drum means.

30. The device according to claim 27, wherein said first conveyor belt means are located at different levels, said second conveyor belt means being located at the level of the lowest first conveyor belt means.

31. The device according to claim 13, further comprising intake and delivery means for said device, at least one intake means and one delivery means being located at different vertical levels to constitute said device a vertical conveyor for the material.

32. The device of claim 12, wherein the deflection blades are swivel mounted.

References Cited

UNITED STATES PATENTS

| | | | |
|---|---|---|---|
| 416,648 | 12/1889 | Simonis | 34—115 X |
| 525,758 | 9/1894 | Craney | 34—115 |
| 2,045,115 | 6/1936 | Allen et al. | 34—114 X |

FOREIGN PATENTS

| | | |
|---|---|---|
| 1,145,127 | 3/1963 | Germany. |
| 816,094 | 7/1959 | Great Britain. |
| 937,103 | 9/1963 | Great Britain. |
| 944,999 | 12/1963 | Great Britain. |

FREDERICK L. MATTESON, JR., *Primary Examiner.*

A. D. HERRMANN, *Assistant Examiner.*